United States Patent
Tsai et al.

(10) Patent No.: US 7,822,122 B2
(45) Date of Patent: Oct. 26, 2010

(54) METHOD FOR INTERPOLATIONS AFTER EDGE DETECTIONS IN DE-INTERLACING PROCESS

(75) Inventors: Tsung-Han Tsai, Taoyuan County (TW); Hseuh-Liang Lin, Miaoli County (TW)

(73) Assignee: National Central University, Taoyuan (TW)

(*) Notice: Subject to any disclaimer, the term of this patent is extended or adjusted under 35 U.S.C. 154(b) by 1153 days.

(21) Appl. No.: 11/454,004

(22) Filed: Jun. 16, 2006

(65) Prior Publication Data
US 2007/0258520 A1    Nov. 8, 2007

(30) Foreign Application Priority Data
May 5, 2006    (TW)    ............... 095115985

(51) Int. Cl.
*H04N 7/12*    (2006.01)
(52) U.S. Cl. ............. 375/240.16; 375/240; 375/240.01; 375/240.12
(58) Field of Classification Search ................ 375/240, 375/240.01, 240.12, 240.16
See application file for complete search history.

(56) References Cited

U.S. PATENT DOCUMENTS 7,269,220 B2 *    9/2007    Alvarez ................. 375/240.12

* cited by examiner

*Primary Examiner*—Allen Wong
(74) *Attorney, Agent, or Firm*—Jackson IPG PLLC; Demian K. Jackson (57) ABSTRACT

Interpolations for a picture is done after edge detections in a de-interlace processor. By doing so, an amount of computing processes and a total time for the computing are saved; an efficiency of the computing is improved; and, a visual quality of the picture is enhanced.

15 Claims, 7 Drawing Sheets

| Field | The present invention | General de-interlacing | Percantage saved (%) |
|---|---|---|---|
| Stefan_cif | 304.87 | 1584 | 80.7% |
| Mobile_calendar_cif | 412.08 | 1584 | 73.9% |
| Hall_monitor_cif | 27.28 | 1584 | 98.2% |

METHOD FOR INTERPOLATIONS AFTER EDGE DETECTIONS IN DE-INTERLACING PROCESS

FIELD OF THE INVENTION

The present invention relates to an interpolation in a de-interlacing algorithm; more particularly, relates to processing a macro-block with a scene-change detection, a motion detection, a field boundary detection and an edge detection to decide an interpolation method in a pixel.

DESCRIPTION OF THE RELATED ARTS

In some prior arts, when a field sequence is inputted, every field in the field sequence is processed with an intra-interpolation method and an inter-interpolation method in the beginning at the same time. And it is wait until the detections where a field is gone through an interpolation method chosen from the intra-interpolation method and the inter-interpolation method. In some other prior arts, weights are further considered. Yet, computing amount becomes large because the interpolation method for a pixel is not decided at the beginning.

In an article by Yu-Lin Chang, etc. in Image Processing, 2003. Proceedings. 2003 International Conference on Volume: 3, 4-17 Sep. 2003"Motion compensated de-interlacing with adaptive global motion estimation and compensation" and in another article by Min Kyu Park, etc. in ICASSP 2004, "New Global Motion Compensated De-interlacing Algorithm Based on Horizontal and Vertical Patterns", the two de-interlacing methods are done at first and an output of only one interpolation method is decided at the output backend. The disadvantages are obvious. The interpolation method for a pixel does not decide in advance and so a computing amount wasted is big, where a motion compensated method is especially applied in the inter-interpolation method.

Although the above prior arts are applied in a de-interlacing processor, a computing amount is big and a computing time is wasted. Hence, the prior arts do not fulfill users' requests on actual use.

SUMMARY OF THE INVENTION

The main purpose of the present invention is to save a computing amount and a computing time, to improve a computing efficiency, and to enhance a picture quality of a field by being processed with a de-interlacing algorithm.

To achieve the above purpose, the present invention is a method for interpolations after edge detections in a de-interlacing process, where a field sequence is inputted; then a scene-change detection, a motion detection, a field boundary detection and an edge detection is processed to filter macro-blocks in a field; then an intra-interpolation method or an inter-interpolation method is done to the filtered macro-blocks; and, finally, the field sequence is outputted, where the intra-interpolation method is an edge-base adaptive weight ELA and the inter-interpolation method is a motion compensated method. Accordingly, a novel method for interpolations after edge detections in a de-interlacing process is obtained.

BRIEF DESCRIPTIONS OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
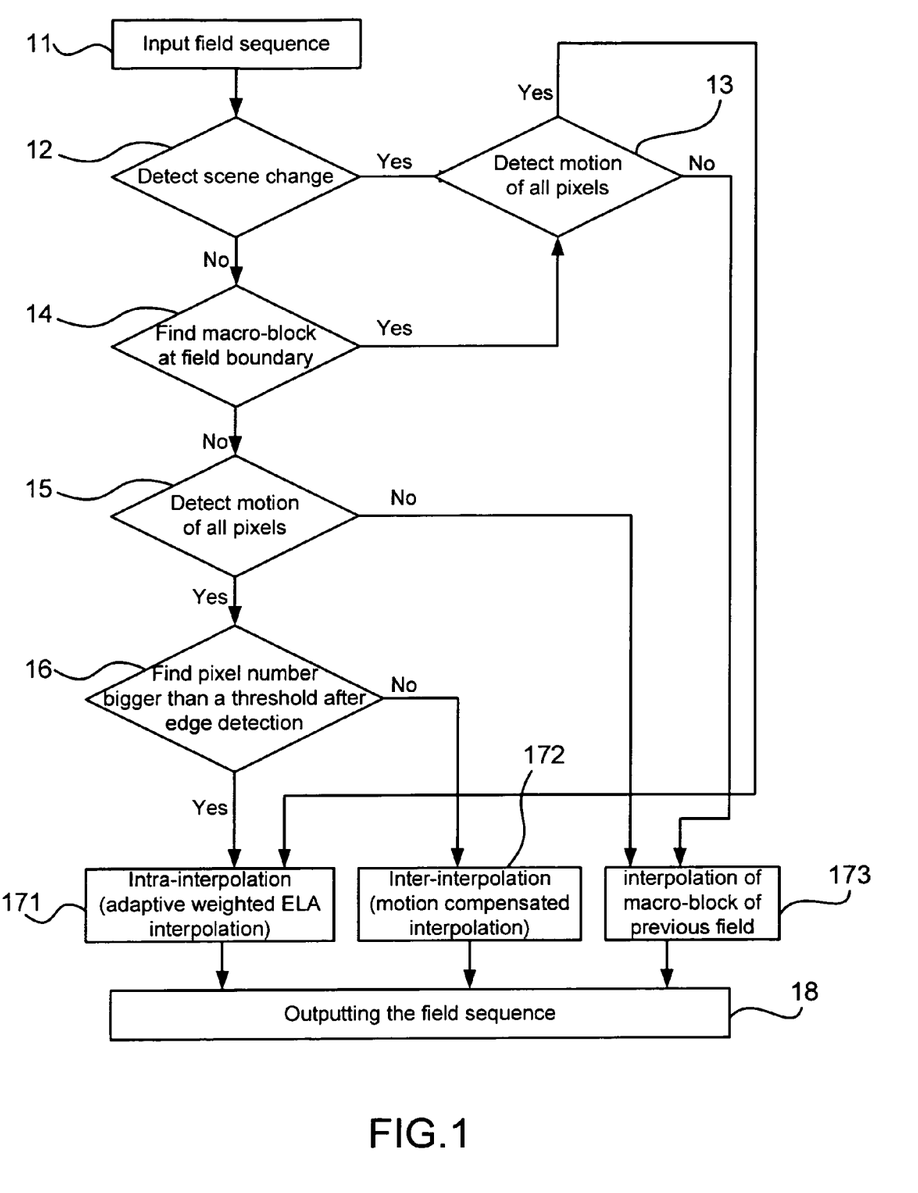
FIG. 1 is a view showing the flow chart of the preferred embodiment according to the present invention.

Please refer to FIG. 1, which is a view of a flow chart of a preferred embodiment according to the present invention. As shown in the figure, the present invention is a method for interpolations after edge detections in a de-interlacing process, where, at first, a scene-change detection, a motion detection, a field boundary detection and an edge detection are done; and, then, an intra-interpolation method or an inter-interpolation method are processed according to the detection results. The present invention comprises the following steps:

(a) Entering a field sequence [11]: A field sequence is entered, where each field in the field sequence comprises at least one macro-block.

(b) Detecting scene change [12]: A scene-change detection is processed to find a scene change of the field sequence. At first, a second previous field is found based on the current interpolating field. The field sequence is stored into a frame temporarily at first so that more information are obtained for the scene-change detection. If a scene change is found in the frame, macro-blocks of the current interpolating field and macro-blocks of the second previous field are obtained and next step is processed; and, if no scene change is found, the macro-block has no scene change and step (d) is processed.

(c) Detecting motion of the macro-block [13]: A current interpolating macro-block is then processed with a motion detection to find a difference value between the current interpolating macro-block and a macro-block at the same position in the second previous field. If the difference value is bigger than a threshold, motion of the current interpolating macro-block are determined and step (g) is processed; and, if the difference value is smaller than the threshold, the motion of the current interpolating macro-block are not determined and step (i) is processed.

(d) Detecting the macro-block to find whether the macro-block is located at a field boundary [14]: The current interpolating macro-block is processed with a field boundary detection to find whether the macro-block is located at a field boundary. The field boundary detection comprises the following steps:

(d1) An edge region of the field is determined by using an enclosure occupying a certain ratio of the field. The edge region is a region outside of the enclosure where human eyes usually do not notice over objects moving in or out the region.

(d2) The macro-block is detected to find whether the macro-block is located at a field boundary. If the macro-block is located in the edge region, the macro-block is located at the field boundary and step (g) is processed; and, if not, next step is processed.

(e) Detecting motion of the macro-block [15]: The current interpolating macro-block is processed with a motion detection to find a difference value between the current processing macro-block and a macro-block at the same position in the second previous field. If the difference value is bigger than a threshold, a motion of the current processing macro-block is determined and next step is processed; and, if not, step (i) is processed.

(f) Detecting the macro-block to find a number of pixels located in the edge region [16]: The current interpolating macro-block is processed with an edge detection to find whether a number of pixels of the macro-block, which are located in the edge region, is greater than a threshold. The edge detection comprises the following steps:

(f1) Noises are removed by using a Gaussian smoothing filter at first.
(f2) Then all pixels in the macro-block are processed with a Sobel mask to obtain values for all of the pixels separately.
(f3) The values for all of the pixels are summed and an average for a pixel is obtained by dividing by the number of the pixels. Then the average is multiplied with 2 to obtain a detection value.
(f4) By referring to the detection value, each pixel in the macro-block is detected to find whether the pixel has an edge.
(f5) And, a number of the pixels which have edge is counted.

The threshold is a number between 10 and 20. If the number of the pixels located in the edge region is greater than the threshold, next step is processed; otherwise, step (h) is processed.

Figure 1A:
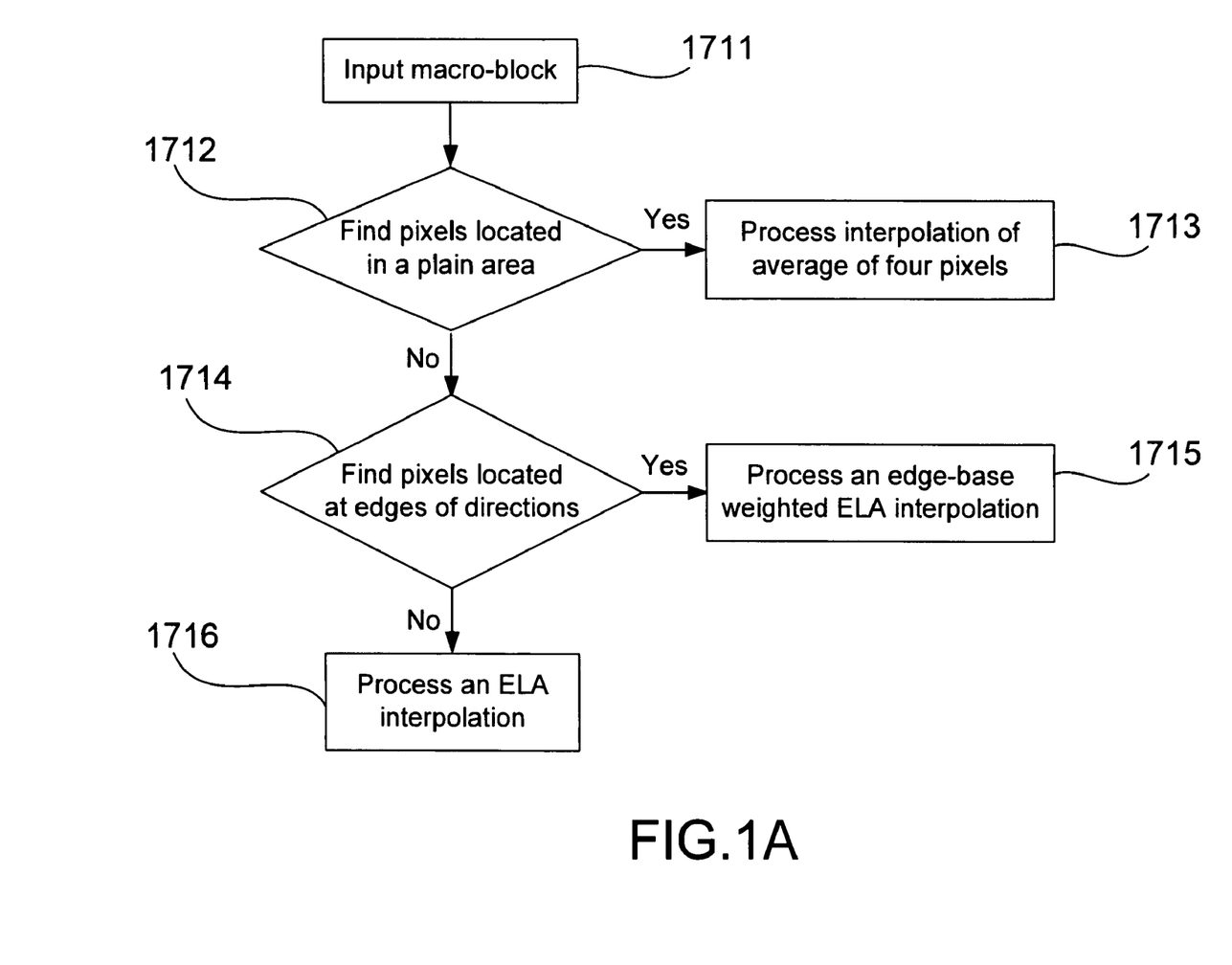
FIG. 1A is a view showing the flow chart of the method using the edge-base adaptive weight ELA.

(g) Processing an intra-interpolation method [171]: Please refer to FIG. 1A, which is a view showing a flow chart of a method using an edge-base adaptive weight ELA (edge-based line average). As shown in the figure, an intra-interpolation method used in the present invention is a method using an edge-base adaptive weight ELA, comprising the following steps:

(g1) Inputting the macro-block [1711]:
All pixels of the current interpolating macro-block are interpolated with an edge-base adaptive weight ELA.

(g2) Finding pixels located in a plain area [1712]: Before interpolating, a Prewitt horizontal edge detection is processed to find whether the current interpolating pixel is in a plain area or not. For any pixel located in a plain area, next step is processed; otherwise, step (g4) is processed.
(g3) Processing an interpolation of an average of four diagonal pixels [1713]: Each of the pixels located in a plain area are processed with an interpolation of an average of two pairs of two pixels located at four apexes of two pairs of two opposite angles. Then, step (j) is processed.
(g4) Finding pixels located at edges of directions [1714]: Each of the pixels not located in a plain area are processed with a Prewitt vertical edge detection to find pixels located at edges of five directions. Therein, each pixel is processed with a vertical edge mask to be compared with a threshold to find whether the pixel is located at an edge of one of the directions. For pixels located at edges of five directions, next step is processed; otherwise, step (g6 is processed.
(g5) Processing an edge-base weighted function [1715]: Each of the pixels, located at an edge of a direction, is interpolated with a value obtained from an edge-base weighted function. Then, step (j) is processed.
(g6) Processing an ELA interpolation [1716]: Each of the pixels, not located at any edge of any direction, is interpolated with an ELA. Then, step (j) is processed.

Figure 1B:
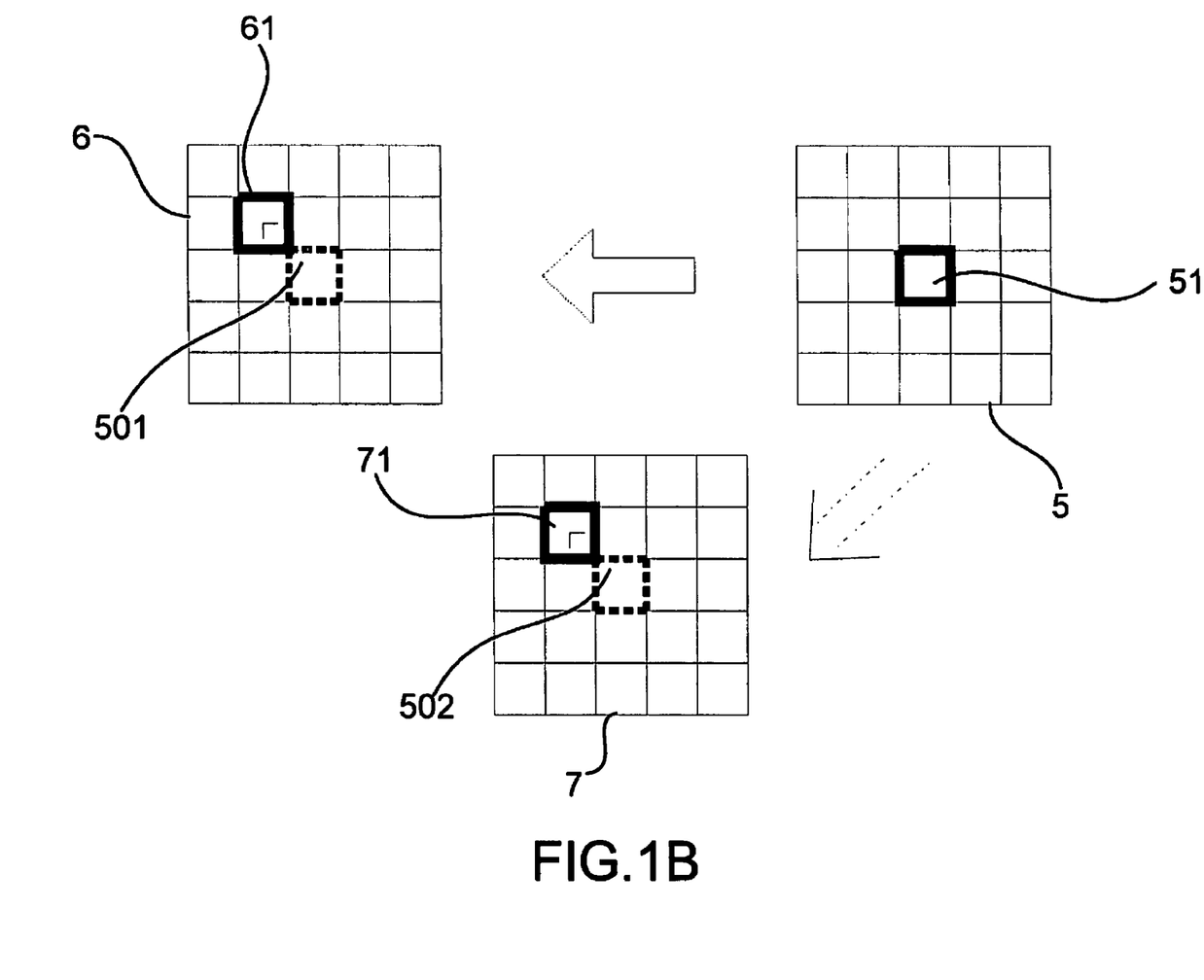
FIG. 1B is a view showing the motion compensated method.

(h) Processing an inter-interpolation method [172]: Please refer to FIG. 1B, which is a view showing a motion compensated method. As shown in the figure, the inter-interpolation method used in the present invention is a motion compensated method, comprising the following steps:

(h1) A second previous field [6] is found based on the current interpolating field [5]; and, in the second previous field [6], a first corresponding macro-block [61] most similar to the current interpolating macro-block [51] is found. Thus, a first motion vector [501] is obtained between the first corresponding macro-block [61] and the current interpolating macro-block [51].
(h2) Then a previous field [7] is obtained based on the current interpolating field [5]; and, a second corresponding macro-block [71] in the previous field [7] is obtained, where a second motion vector [502] obtained between the second corresponding macro-block [71] and the current interpolating macro-block [51] has the same value as the first motion vector [501]. Then step (j) is processed.

(i) Processing interpolation of pixels of a macro-block of the previous field [173]: All pixels of the current interpolating macro-block are processed with an interpolation of pixels of the macro-block at the same position of the previous field.

(j) Outputting the field sequence [18]: All macro-blocks in the current interpolating field are processed through step (c) to step (i) coordinated with a second previous field found based on the current interpolating field; and, then, the field sequence is outputted.

Through the above steps, a novel method for interpolations after edge detections in a de-interlacing process is obtained.

The intra-interpolation method used in the present invention is an edge-base adaptive weight ELA method, where all pixels located at edges are exactly detected and are processed with interpolations. The present invention can be applied to a motion picture of high visual quality having a background full of letters or complex lines.

The adaptive weighted ELA interpolation uses a horizontal edge detection and a vertical edge detection to decide the interpolation a pixel requires, where the value being interpolated is obtained from a four diagonal point average function; or, is an edge-base adaptive weight ELA or an ELA.

Figure 2A:
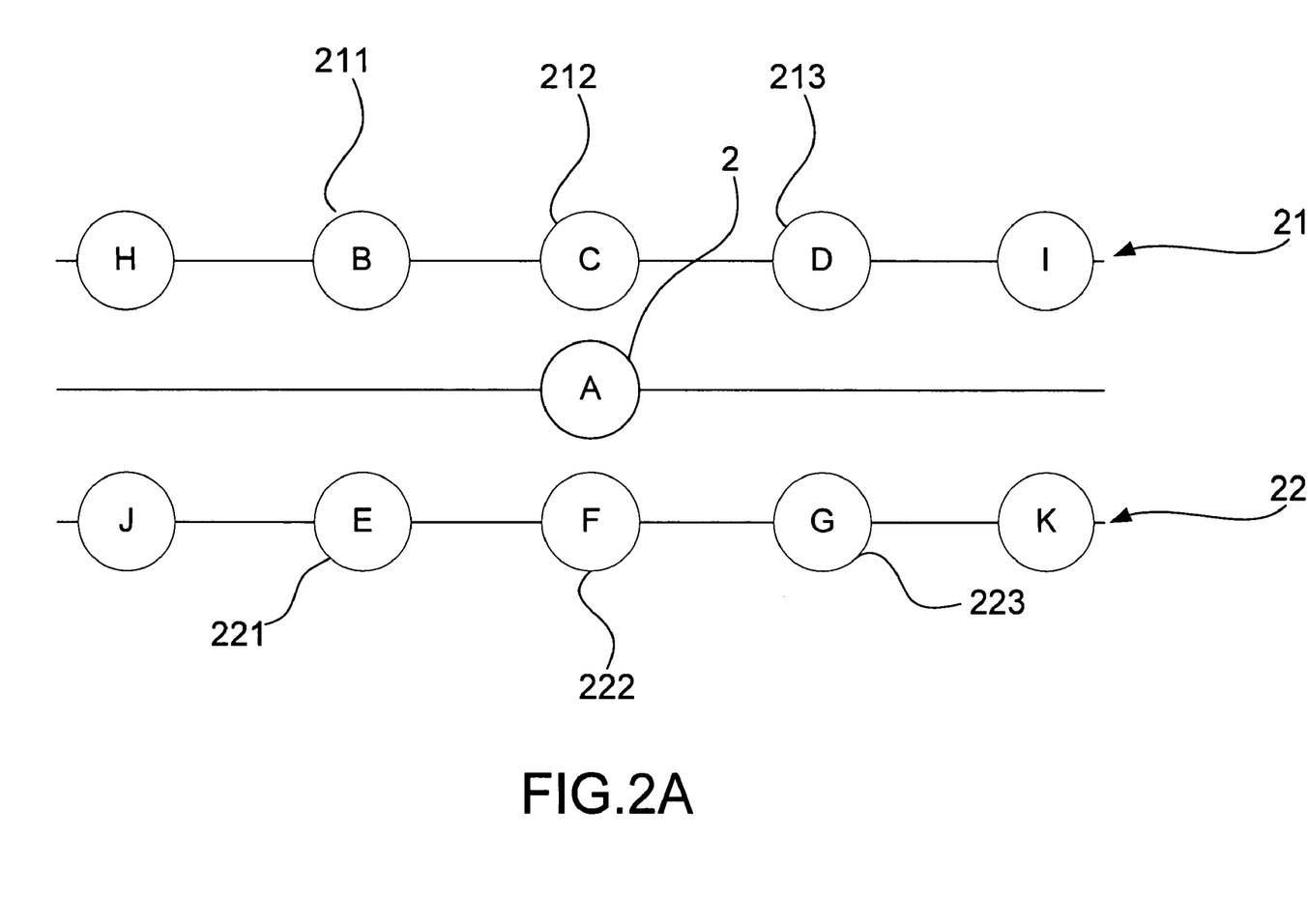
FIG. 2A is a view showing the horizontal edge detection using the edge-base adaptive weight ELA.

Please refer to FIG. 2A, which is a view showing a horizontal edge detection using the edge-base adaptive weight ELA. As shown in the figure, in the horizontal edge detection, a first scan line [21] above pixel A [2], which is to be interpolated, and a second scan line [22] below the pixel A [2] are obtained. Pixel B [211], pixel C [212] and pixel D [213] are obtained on the first scan line [21]; and pixel E [221], pixel F [222] and pixel G [223] are obtained on the second scan line [22]. By using the above six pixels, pixel A [2] are detected to find whether the pixel A [2] is located in a plain area.

If, in the above horizontal edge detection, pixel A [2] is found as being located in a plain area, an interpolation is processed by using an average of two pairs of two opposite pixels, where the four pixels are the pixel B [211], the pixel D [213], the pixel E [221] and the pixel G [223].

Figure 2B:
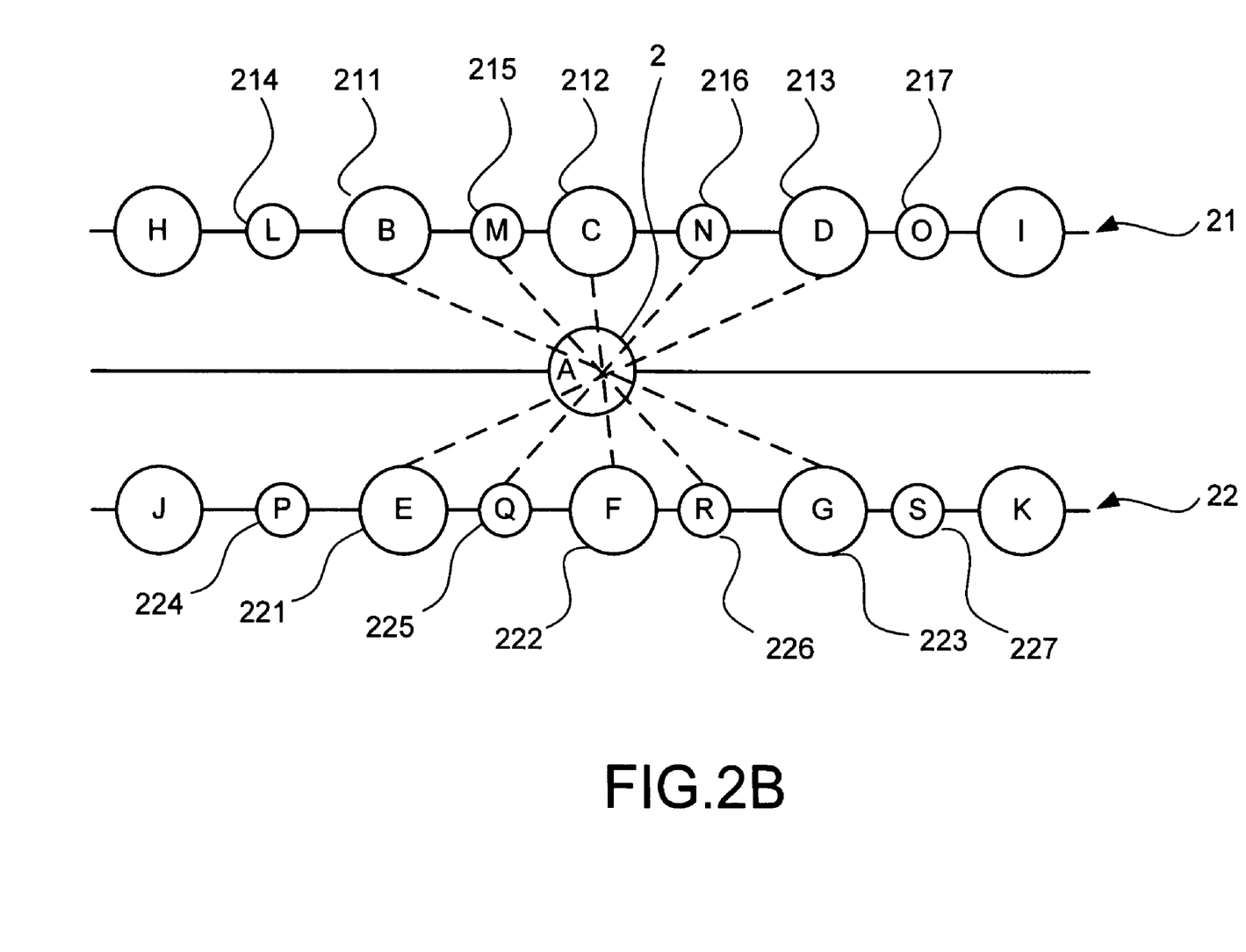
FIG. 2B is a view showing the vertical edge detection using the edge-base adaptive weight ELA.

Please further refer to FIG. 2B, which is a view showing a vertical edge detection using the edge-base adaptive weight ELA. As shown in the figure, if the pixel A [2] is found as being not located in a plain area through the above horizontal edge detection, the pixel A [2] is then processed with a vertical edge detection to find whether the pixel A [2] is located at an edge of a direction. The vertical edge detection comprises the following steps:

(g21) A half-pixel is inserted between every two adjacent pixels on a first scan line [21] above the pixel A [2]; and is inserted between every two adjacent pixels on a second scan line [22] below the pixel A [2]. Thus, half-pixels of pixel L [214], pixel M [215], pixel N [216] and pixel 0 [217] are inserted on the first scan line [21]; and half-pixels of pixel P [224], pixel Q [225], pixel R [226] and pixel S [227] are inserted on the second scan line [22].

(g22) By using a vertical edge mask, five values of the pixel A [2] in five directions separately to five lines are obtained separately, where the five lines are a line of pixel B [211] and pixel G [223], a line of pixel C [212] and pixel F [222], a line of pixel D [213] and pixel E [221], a line of pixel M [215] and pixel R [226], and a line of pixel N [216] and pixel Q [225].

(g23) And, the five values are summed and an average value is obtained from the summed value divided by five. Thus, a threshold is defined as adding 30 to the average value. Then, the five values are compared with the threshold. If any one of the five values is greater than the threshold, it is considered that the pixel A [2] is located at an edge of the direction the one value represented.

If the pixel A [2] is found to be located at an edge of a direction after the vertical edge detection, the pixel A [2] is processed through an interpolation with a value obtained from an edge-base weight function, comprising the following steps:

(g41) The five values of pixel A [2] in the five directions is processed with a vertical edge mask at first.

(g42) Then, because a difference between pixels located at an edge of the direction is small, the pixel A [2] is divided by differences between sets of two pixels on each line of five lines located at edges of the five directions to obtain reference values.

(g43) And, the pixel A [2] is processed with interpolations of weighted values obtained from the reference values. When processing the interpolation, the weighted values are weights of the five directions obtained through dividing each reference value by the sum of the reference values of the five direction s. A n d the interpolation is done according to the weights of the five directions.

Figure 3:
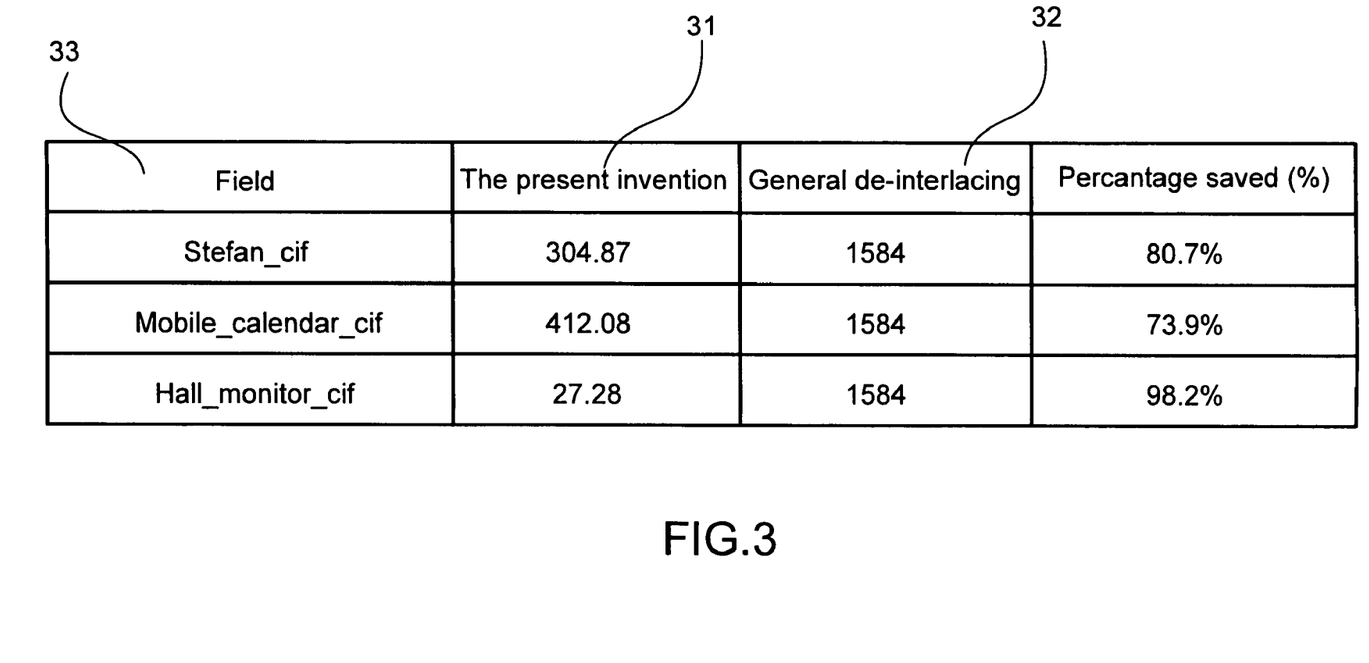
FIG. 3 is a view showing the computation comparison result.

Please refer to FIG. 3, which is a view showing the computation comparison result. As shown in the figure, interpolations are done to fields [33] of 'cif' format by using the present invention [31] and a general de-interlace method [32], where three fields of 'cif' format are used.

The present invention processes an intra-interpolation method or an inter-interpolation method after a scene-change detection, a motion detection, a field boundary detection and a n edge detection. The figure shows the number of the macro-blocks which is filtered to process a motion compensated method according to the present invention [3 1]. The numbers are 304.87, 412.08 and 27.28. And the motion compensated method is an inter-interpolation method.

The general de-interlace method [32] processes each macro-block in the fields [33] with a motion compensated method. Since every field [33] has 1584 macro-blocks, the de-interlace method [32] processes each field with 1584 times of the motion compensated method. Hence, the present invention filters macro-blocks in the field to be processed with the motion compensated method, where a computing amount and a computing time are saved and a computing efficiency is improved.

Figure 4:
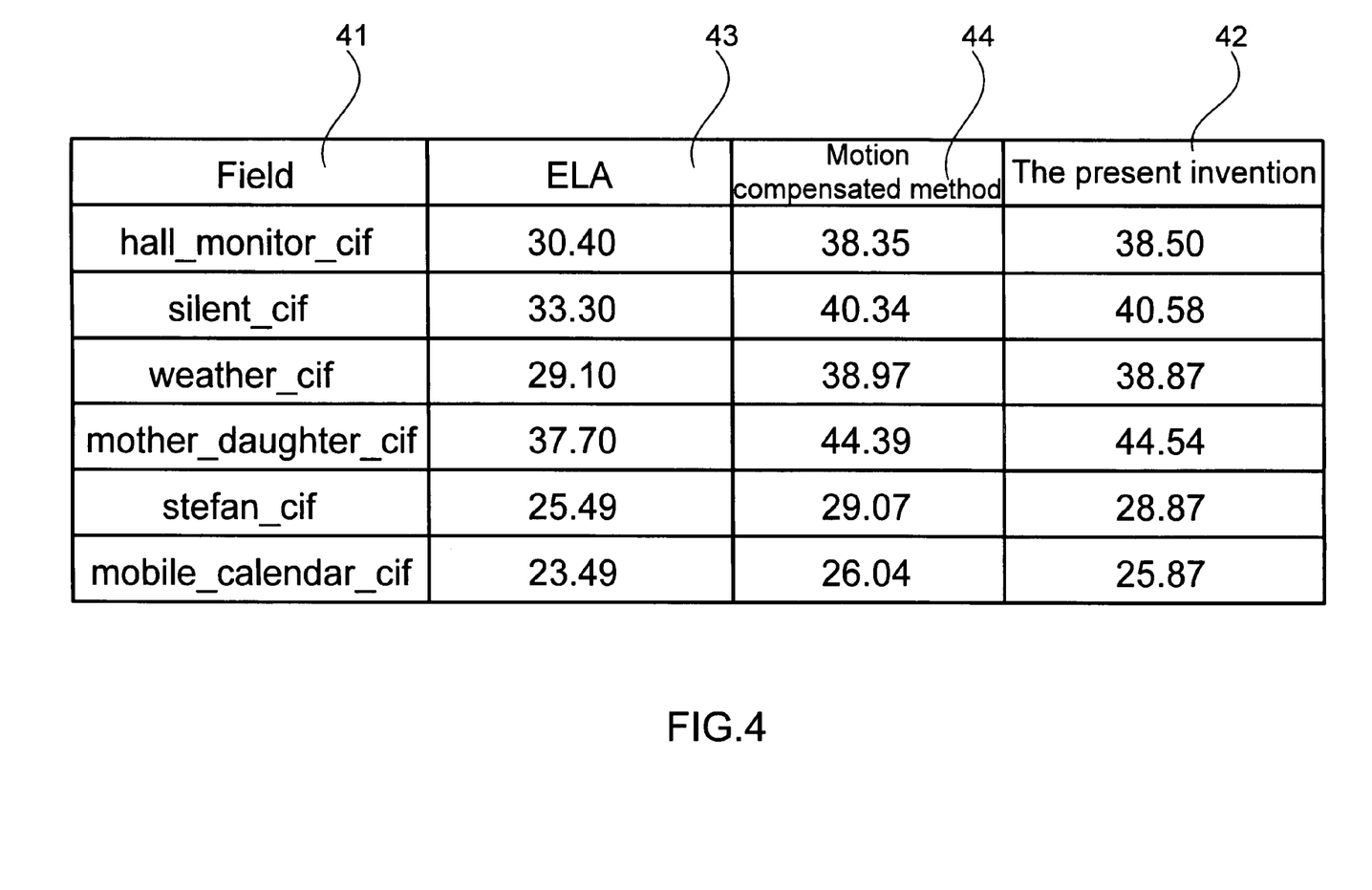
FIG. 4 is a view showing the PSNR comparison result.

Please refer to FIG. 4, which is a view showing the PSNR (Peak Singal Noise Ratio) comparison result. As shown in the figure, in a de-interlace processor, six fields [41] are processed with the present invention [42], an ELA interpolation [43] and a motion compensated method [44]. Peak signal-to-noise ratios (PSNR) after de-interlacing are shown in the figure, which indicate the fields processed with the present invention has better qualities. Thus, the present invention improves picture quality and visual aesthetics.

The present invention detects areas in the fields to decide an interpolation method so that a best interpolation method is applied to the area. As seen from the results, the present invention has a good performance no matter on the number of the macro-blocks processing the motion compensated method, or on the visual aesthetics of the fields.

To sum up, the present invention is a method for interpolations after edge detections in a de-interlacing process, where a computation process amount and a total computing time are saved, an computation efficiency is improved, and a picture quality is enhanced.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method for interpolations after edge detections in a de-interlacing process, comprising steps of:
    (a) inputting a field sequence, wherein each field in said field sequence comprises at least one macro-block;
    (b) detecting a scene change of said field sequence, wherein a macro-block of said field has a scene change when said scene change of said field sequence is found; and wherein said macro-block does not have a scene change when said scene change of said field sequence is not is found;
    (c) when said scene change of said macro-block is found, detecting motion of all pixels of said current interpolating macro-block, wherein step (g) is processed when said motion of all pixels is found; and wherein step (i) is processed when said motion of any pixel is not found;
    (d) when said scene change of said macro-block is not found, detecting said macro-block to find whether said macro-block is located at a field boundary, wherein step (g) is processed when said macro-block is located at the field boundary; and wherein next step is processed when said macro-block is not located at the field boundary;
    (e) detecting motion of said macro-block, wherein next step is processed when said motion of said macro-block is found; and wherein step (i) is processed when said motion of said macro-block is not found;
    (f) Detecting said macro-block to find a number of pixels located in the edge region, wherein next step is processed when said number is greater than a threshold; and wherein step (h) is processed when said number is not greater than said threshold;
    (g) processing all pixels in said macro-block with an intra-interpolation method, wherein step (j) is processed after said intra-interpolation method;
    (h) processing all pixels in said macro-block with an inter-interpolation method, wherein said field sequence is outputted after said inter-interpolation method, and step (j) is processed;

(i) processing all pixels in said macro-block with an interpolation of pixels of a corresponding macro-block from a previous field, wherein said field sequence is outputted after said interpolation of pixels of said corresponding macro-block of said previous field; and (j) processing the other macro-blocks in said field through step (c) to step (i) to outputting said field sequence.

2. The method according to claim 1,
wherein said detecting in step (b) is done by a scene-change detection;
wherein said scene-change detection comprises steps of:
 (b1) storing a field sequence into a frame temporarily; and
 (b2) detecting a scene change of said frame; and
wherein a field in said frame has a scene change when said frame has a scene change.

3. The method according to claim 1,
wherein said detecting in step (c) is done by using a motion detection.

4. The method according to claim 1,
wherein said detecting in said step (d) is done by using a field boundary detection; and
wherein said field boundary detection comprises steps of:
 (d1) obtaining an edge region of said field by using an enclosure occupying a certain ratio of said field; and
 (d2) detecting said macro-block to find whether said macro-block is located at a field boundary.

5. The method according to claim 1
wherein said detecting in step (e) is done by using a motion detection.

6. The method according to claim 1,
wherein said detecting in step (f) is done by using an edge detection and
wherein said edge detection comprises steps of:
 (f1) removing noises by using a Gaussian smoothing filter;
 (f2) processing all pixels in said macro-block with a Sobel mask;
 (f3) summing values of said all pixels, obtaining an average of a pixel and multiplying said average with 2 to obtain a detection value;
 (f4) by referring to said detection value, detecting each pixel in said macro-block to find whether said pixel has an edge; and
 (f5) counting a number of said pixels which have edge.

7. The method according to claim 1,
wherein said threshold in step (f) is a value between 10 and 20.

8. The method according to claim 1,
wherein said intra-interpolation method in step (g) processes said macro-block of said field with an edge-base adaptive weight ELA (edge-based line average).

9. The method according to claim 8,
wherein said edge-base adaptive weight ELA is obtained through steps of:
 (g1) inputting said macro-block, wherein a plurality of pixels of said macro-block are located in edge of said field;
 (g2) processing said pixels with a Prewitt horizontal edge detection to find pixels located in a plain area, wherein next step is processed for pixels located in plain areas; and wherein step (g4) is processed for pixels not located in plain areas;
 (g3) processing each pixel with a n interpolation of an average of four diagonal pixels, wherein said pixels are located at apexes of two pairs of two opposite angles and step (j) is processed;

(g4) finding pixels located at edges of five directions, wherein next step is processed for pixels located at edges of said five directions; and wherein step (g6) is processed for pixels not located at any edge of any of said five directions;
(g5) processing each pixel with an edge-base weighted function and processing step (j); and
(g6) processing each pixel with an ELA interpolation and processing step (j).

10. The method according to claim 9,
wherein, in step (g2), said horizontal edge detection is a Prewitt edge detection using two pairs of three pixels located on two scan lines at two sides of a pixel.

11. The method according to claim 9,
wherein, in step (g3), a Prewitt edge detection is used to find pixels located at edges of five directions, said Prewitt edge detection comprising steps of:
 (g21) inserting a half-pixel between every two adjacent pixels on a first scan line above said pixel and between every two adjacent pixels on a second scan line below said pixel;
 (g22) by using a vertical edge mask, obtaining five values of said pixel in five directions separately to five lines, wherein said five lines are lines of a pixel on said first scan line and a pixel on said second scan line; and
 (g23) defining a threshold and comparing each value of said five values with said threshold to find whether said current interpolating pixel is located at edge of a direction of said five directions said value of said five values represented.

12. The method according to claim 11,
wherein said threshold is obtained through processing said five values with a vertical edge mask, summing said five values, and adding 30 to a summed value obtained.

13. The method according to claim 9,
wherein said value of said edge-base weighted ELA in step (g5) is obtained through steps of:
 (g41) processing five values of said pixel in said five directions with a vertical edge mask;
 (g42) dividing said value by a difference between two other pixels on each line of five lines located at edges of said five directions to obtain reference values; and
 (g43) processing said pixel with interpolations of weighted values obtained from said reference values.

14. The method according to claim 1,
wherein said macro-block is processed with said inter-interpolation method in step (h) by using a motion compensated method.

15. The method according to claim 14,
wherein said motion compensated method comprises steps of:
 (h1) obtaining a second previous field based on said current interpolating field to obtain a first corresponding macro-block most similar to said macro-block, wherein a first motion vector between said first corresponding macro-block and said macro-block is obtained; and
 (h2) obtaining a previous field based on said current interpolating field to obtain a second corresponding macro-block, wherein a second motion vector is obtained between said second corresponding macro-block and said macro-block; and wherein said second motion vector and said first motion vector have a same value.

* * * * *